United States Patent
Liu et al.

(10) Patent No.: US 7,173,945 B1
(45) Date of Patent: Feb. 6, 2007

(54) REMOVING JITTER BY ADAPTIVE SLOPE TRACKING

(75) Inventors: Hain-Ching Liu, Fremont, CA (US); Dayin Gou, San Jose, CA (US); Yuen-Wen Lee, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1087 days.

(21) Appl. No.: 10/096,191

(22) Filed: Mar. 11, 2002

(51) Int. Cl.
*H04J 3/06* (2006.01)
*H04L 7/00* (2006.01)

(52) U.S. Cl. ..................... 370/516; 375/371
(58) Field of Classification Search ............ None
See application file for complete search history.

(56) References Cited

U.S. PATENT DOCUMENTS

| | | | |
|---|---|---|---|
| 5,497,200 A | 3/1996 | Otaki et al. | |
| 5,543,853 A | 8/1996 | Haskell et al. | |
| 5,543,854 A | 8/1996 | Morikawa et al. | |
| 5,565,924 A | 10/1996 | Haskell et al. | |
| 5,594,553 A | 1/1997 | Sato | |
| 5,790,543 A * | 8/1998 | Cloutier | 370/252 |
| 5,828,414 A | 10/1998 | Perkins et al. | |
| 5,862,450 A | 1/1999 | Mandal et al. | |
| 6,122,337 A * | 9/2000 | Bleiweiss et al. | 370/395.62 |
| 6,259,677 B1 * | 7/2001 | Jain | 370/252 |
| 6,937,622 B2 * | 8/2005 | Gross | 370/516 |
| 2002/0024970 A1 * | 2/2002 | Amaral et al. | 370/468 |

OTHER PUBLICATIONS

ISO/IEP "*Information Technology-Generic Coding Of Moving Pictures And Associated Audio Information: Video*", ISO/IEC 13818-2, 1995, 209 pages.

* cited by examiner

*Primary Examiner*—Hassan Kizou
*Assistant Examiner*—Brian Roberts
(74) *Attorney, Agent, or Firm*—Beyer Weaver & Thomas, LLP

(57) ABSTRACT

The present invention addresses the issue of jitter compounded by clock drifting in streaming media applications. In addressing jitter, the present invention attempts to recover the desired (de-jittered) arrival time at a gateway even if there is a frequency difference between the clocks of the original media source and the gateway. The desired arrival time is used with the addition of a constant to schedule the packet delivery time for delivery to a user via a network. Each packet arriving at the gateway contains an arrival timestamp. Using packets, which also contain sending time stamps, the invention determines the delivery time for each packet.

16 Claims, 12 Drawing Sheets

230

240

REMOVING JITTER BY ADAPTIVE SLOPE TRACKING

FIELD OF THE INVENTION

The present invention relates to the issue of jitter combined with clock drifting in streaming media systems such as Video on Demand (VoD).

BACKGROUND OF THE INVENTION

Streaming media systems such as Video on Demand (VoD) provide streaming media to a viewer. Streaming media may be a movie, television show or other multi-media information. Streaming media may be transported over a variety of mediums such as coaxial cable or satellite. Further, streaming media may be sent in a variety of formats such as MPEG over the Internet. Regardless of the format in which the streaming media is transmitted, it will be broken up into "packets". Each packet provides a portion of the transmission.

In order for a receiver of the transmission (e.g. a digital television) to properly decode and display the transmission, the packets must arrive in order and on time. Unfortunately, this is not always the case. As the packets of a transmission traverse the path from transmitter to receiver, the spacing between the packets may be altered. The delay between the spacing of blocks is referred to as jitter. A more precise definition of jitter is provided by the International Telecommunication Union (ITU), namely:

Jitter: Short-term variations of the significant instants of a digital signal from their ideal positions in time.

When a real time application, such as a digital television, receives packets of information, the packets are displayed as they are received. However, if a new packet arrives while previous packets are still being displayed, it is necessary to buffer the new packet. Buffering requires the use of a high speed storage device, which adds to the cost of the display device. Conversely, if a packet arrives too late, there is an interruption in the display of the transmission, which is obvious and annoying to the viewer.

To add further complexity, a transmission may contain multiple "streams" of information, for example one stream for each movie and one stream for each set of commercials. The combining of multiple streams into a single transmission is known as multiplexing. By its very nature, multiplexing introduces jitter. By placing packets from one stream between packets from another, time delays and thus the possibility of jitter, are introduced. Further, jitter may be introduce in non-multiplexed environments if packets are not managed properly.

There is thus a need for a simple and cost effective solution to reduce jitter in a streaming media environment. The present invention addresses this need.

DETAILED DESCRIPTION OF THE INVENTION

Figure 1:
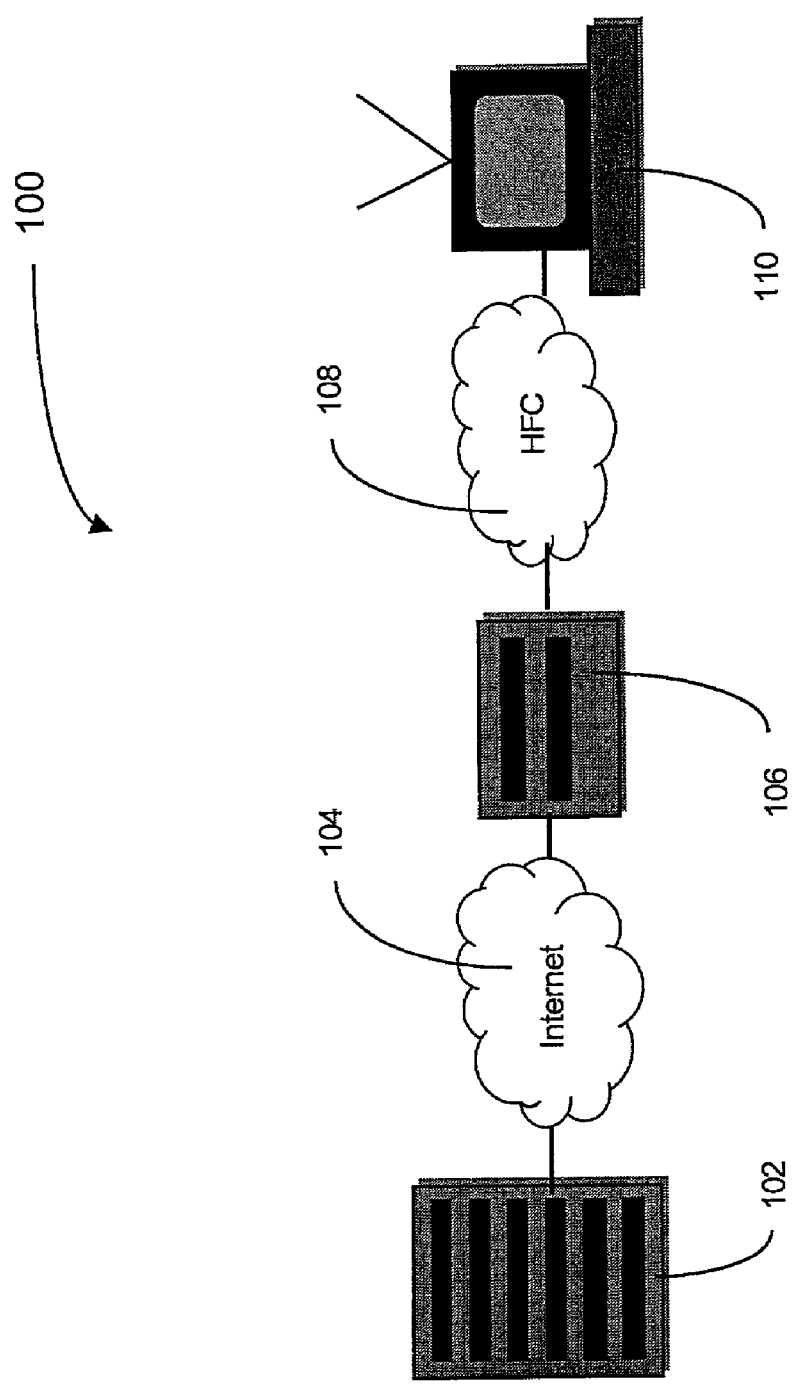
FIG. 1 is a block diagram of a VoD system.

Referring now to FIG. 1, a block diagram of a Video on Demand (VoD) system is shown generally as 100. System 100 comprises three major components, namely video source 102, which provides a source video transmission, gateway 106 and a video decoder 110. Internet protocol (IP) network 104 (such as the Internet) connects video source 102 with gateway 106. Gateway 106 is connected to decoder 110 by Hybrid Fiber Coaxial Cable (HFC) network 108.

The example of IP network 104 and HFC network 108 is provided for illustration only, it is not the intent of the inventors to limit the use of the present invention to a specific protocol such as IP or a specific delivery method such as HFC. They serve simply as examples to aid the reader in understanding the present invention.

HFC is a telecommunications link in which optical fiber cable and coaxial cable comprise different portions of a network carrying content such as VoD. By way of example, VoD system 100 may use fiber optic cable from video gateway 106 to a plurality of serving nodes (not shown) located near decoders 110 and then use coaxial cable from the serving nodes to connect with decoders 110. An advantage of HFC is that the high bandwidth of fiber optic cable may be provided to a user without having to replace all existing coaxial cable.

Gateway 106 also provides remuxing, transrating or transcoding of the input from IP network 104, which is typically in the MPEG-2 transport format.

The term "mux" is a short form for "multiplexing". Multiplexing simply means combining a number of signals over a single connection, such as multiple telephone calls over a single wire. Video source 102 may multiplex signals before transmitting them to gateway 106. Gateway 106 may "remux": the signals before sending them on. Remuxing, is simply the step of demuxing (i.e. undoing the step of muxing) and providing a newly multiplexed signal. The step of remuxing, is typically performed to ensure that the signal received from IP network 104 is properly distributed to HFC network 110. Once demuxing has been completed, gateway 106 may transrate or transcode the packets of the stream received. Transrating refers to a change in the content of the stream, typically achieved by reducing the information transmitted. Transcoding refers to a change in the format of the packets in a stream, for example from MPEG-2 to MPEG-4.

For video decoder 110 to play back the video transmission from video source 102 smoothly and continuously, the delay between video source 102 and video decoder 110 must be constant. However, this condition cannot be automatically satisfied in VoD system 100 if no corrective measures are taken due to the following reasons:

1. Although the delay between gateway 106 to decoder 110 may be regarded as constant, the connection from video source 102 to the gateway 106 is dependant upon IP network 104 so jitter will be introduced; and 2. The actual clock frequencies used for a timestamp reference running at gateway 106 and video source 102 may be different although both of them should typically run at a common clock speed, such as 27 Mhz.

The arrival time of a video packet at gateway 106 cannot be utilized to schedule the transmission of the packet to HFC network 108 as the arrival time may be subject to jitter introduced by IP network 104. To solve the problem of scheduling transmission of packets to HFC network 108, some protocols can be employed, such as time stamping each video packet at video source 102 as they are transmitted. Scheduling of output from gateway 106 to HFC network 108 may be achieved by utilizing the timestamp of video source 106 plus a constant delay at gateway 106, to avoid the jitter-contaminated arrival time at gateway 106.

Such a scheme works well if the clocks at video source 102 and gateway 106 run at exactly the same frequency. However, if they run at different frequencies, it will eventually break the smooth and continuous playback on decoder 110 due to buffer underflow or overflow. The exact time when it will break depends on the difference of the clock frequencies, the less the difference, the longer the smooth and continuous playback can be. In most cases, the playback can go ahead without any problems for several hours but problems will most likely show up after one day.

The present invention attempts to recover the desired (de-jittered) arrival time at gateway 106 even if there is a frequency difference between the clocks of video source 102 and gateway 106. This desired arrival time is then used with the addition of a constant to schedule the packet delivery time to HFC network 108.

Each packet arriving at gateway 106 may contain a sending timestamp which can either be the Program Clock Reference (PCR) timestamp embedded in an MPEG-2 transport stream or the Real Time Transport Protocol (RTP) timestamp attached in the IP packet if RTP protocol is used. MPEG-2 refers to a portion of the standards for high quality video transmission developed by the Motion Pictures Expert Group (MPEG). The set of MPEG-2 standards is catalogued by the International Standards Organization (ISO) as ISO 13818. RTP is used to send data in one direction with no acknowledgement. The header of each RTP packet contains a time stamp so the recipient can reconstruct the timing of the original data, as well as a sequence number, which lets the recipient deal with missing, duplicate or out-of-order packets. The Internet Engineering Task Force (IETF) describes RTP in RFC 1889. The International Telecommunication Union employs RTP in the multimedia communications standard H.323.

Each packet arriving at gateway 106 has attached to it an arrival timestamp. Thus, some packets may have both a sending timestamp and an arrival timestamp. Using these two timestamps, the present invention tries to determine the delivery time for each packet.

Once the delivery time for a packet having a sending timestamp is correctly calculated, the delivery time for a packet without a sending time stamp can be linearly interpolated based on the sending timestamp bearing packets which precede and follow the packet without a sending timestamp. Thus, the present invention considers only packets, which contain a sending timestamp and an arrival timestamp.

Figure 2:
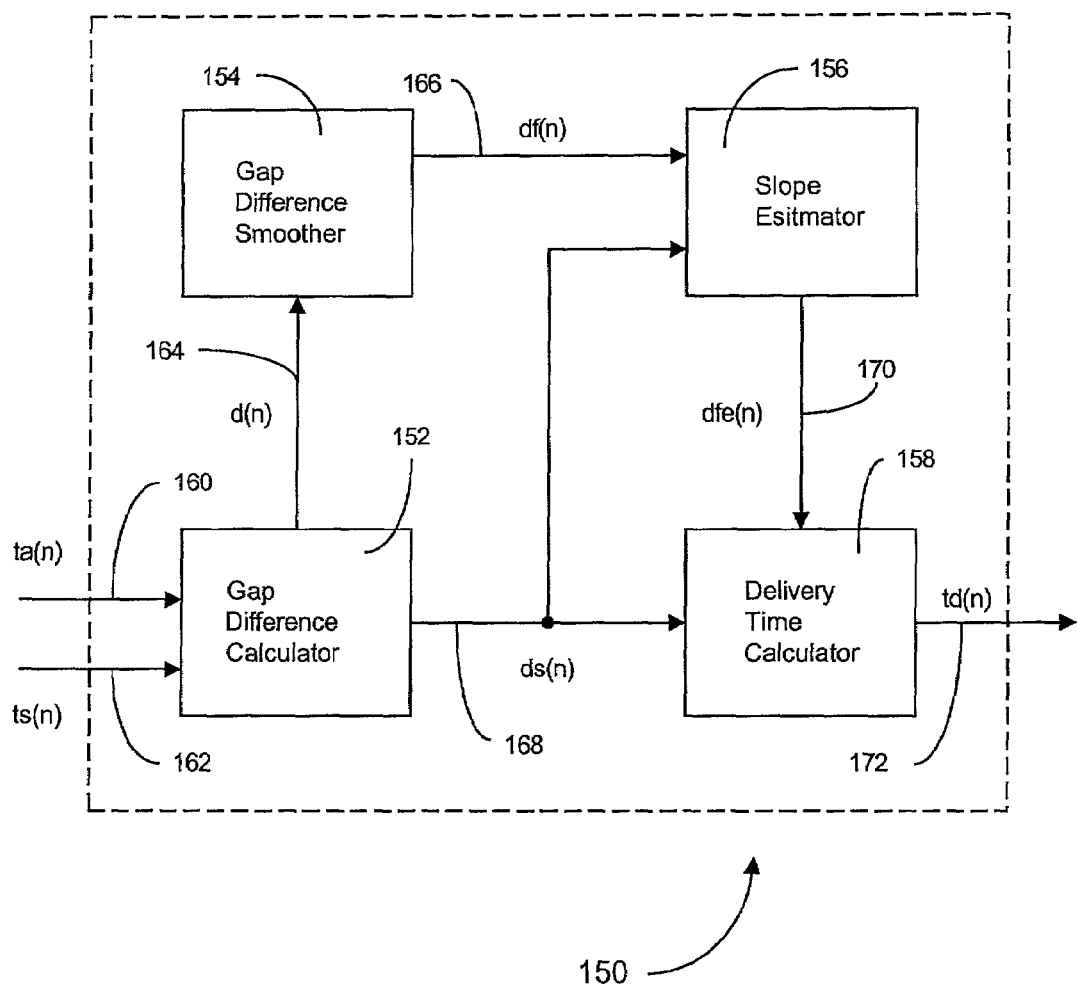
FIG. 2 is a block diagram of the logical components of the present invention.

Referring now to FIG. 2, a block diagram of the logical components of the present invention is shown generally as 150. From the highest level, the present invention consists of the four sub-blocks shown in FIG. 2, namely gap difference calculator 152, gap difference smoother 154, slope estimator 156 and delivery time calculator 158. In the preferred embodiment the present invention resides in gateway 106.

Gap difference calculator 152 takes as input arrival timestamp ta(n) 160, and sending timestamp ts(n) 162 for the current packet "n". Gap difference calculator 152 computes the relative difference of arrival time stamp 160 and sending time stamp 162 using the first packet received in a transmission as the base and outputs the relative gap difference d(n) 164 as input to gap difference smoother 154. Gap difference calculator 152 also computes sending time gap ds(n) 168 as input to delivery time calculator 158.

Gap difference smoother 154 removes high frequency variation of any delay caused by jitter. Any low-passing filtering (LPF) method can be employed here for that purpose. As those skilled in the art will recognize, examples of such low-passing filtering include, but are not limited to, Finite Impulse Response (FIR) filters, Infinite Impulse Response (IIR) filters, or a nonlinear LPF like median filter or minimum filter.

The output of gap difference smoother 154 is change in gap difference df(n) 166. Change in gap difference df(n) 166 and sending time gap ds(n) 168 are input to slope estimator 156. Slope estimator 156 detects the slowly changing slope caused by the frequency difference of the clocks running at video source 102 and gateway 106. Estimated change in gap difference dfe(n) 170 is output from slope estimator 156 as input to delivery time calculator 158. Delivery time calculator 158 combines the delay caused by sending time gap ds(n) 168 with estimated change in gap difference dfe(n) 170 and the delivery time of the previous packet to calculate a delivery time td(n) 172 for the current packet ("n").

If the frequency difference between video source 102 and gateway 106 is positive or negative, delivery time td(n) 172 may speed up or slow down respectively at gateway 106. This adjustment is achieved by tracking the slope in the df( ) versus ds( ) curve, i.e. the values of change in gap difference df(n) 166 and sending time gap ds(n) 168. This adjustment is based on the following facts:

1. within a relatively short time window, the clock frequency difference can be regarded as a constant; and 2. for any two consecutive packets, the change in gap difference df(n) 166 and sending time gap ds(n) 168 should be proportional, with the ratio (slope) fluctuating around a slowly changing average value. If the clocks at video source 102 and gateway 106 run at the same frequency, this average value should be 1 with no change in slope, otherwise it will be a value a little less or greater than 1 which will result in a non-zero slope change.

In the present invention the previous ratio (slope) and the sending time gap ds(n) 168 are utilized to estimate the arrival time for the current packet. According to error between the actual (smoothed by LPF) arrival time and the estimated arrival time, the present invention knows whether the estimation is too big or too small and can adjust the ratio accordingly. For example, if the error is a positive number, then the estimation is less than the real value, and the ratio (slope) is increased. Similarly, if the error is a negative number then ratio (slope) is decreased. The actual increment or decrement of the ratio (slope) is achieved by multiplying the error by a constant. The process of adjusting the ratio is described in detail in the description of FIG. 5 below.

The detail for each of the four sub-blocks 152, 154, 156 and 158 will be described by mathematical equations and Digital Signal Processor (DSP) signal flow graphs which utilize the symbols in the following Legend 1.

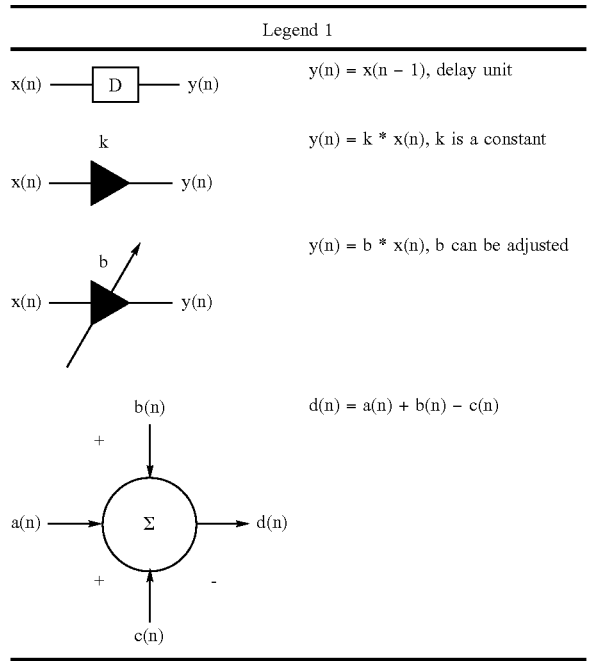

Legend 1

Figure 3:
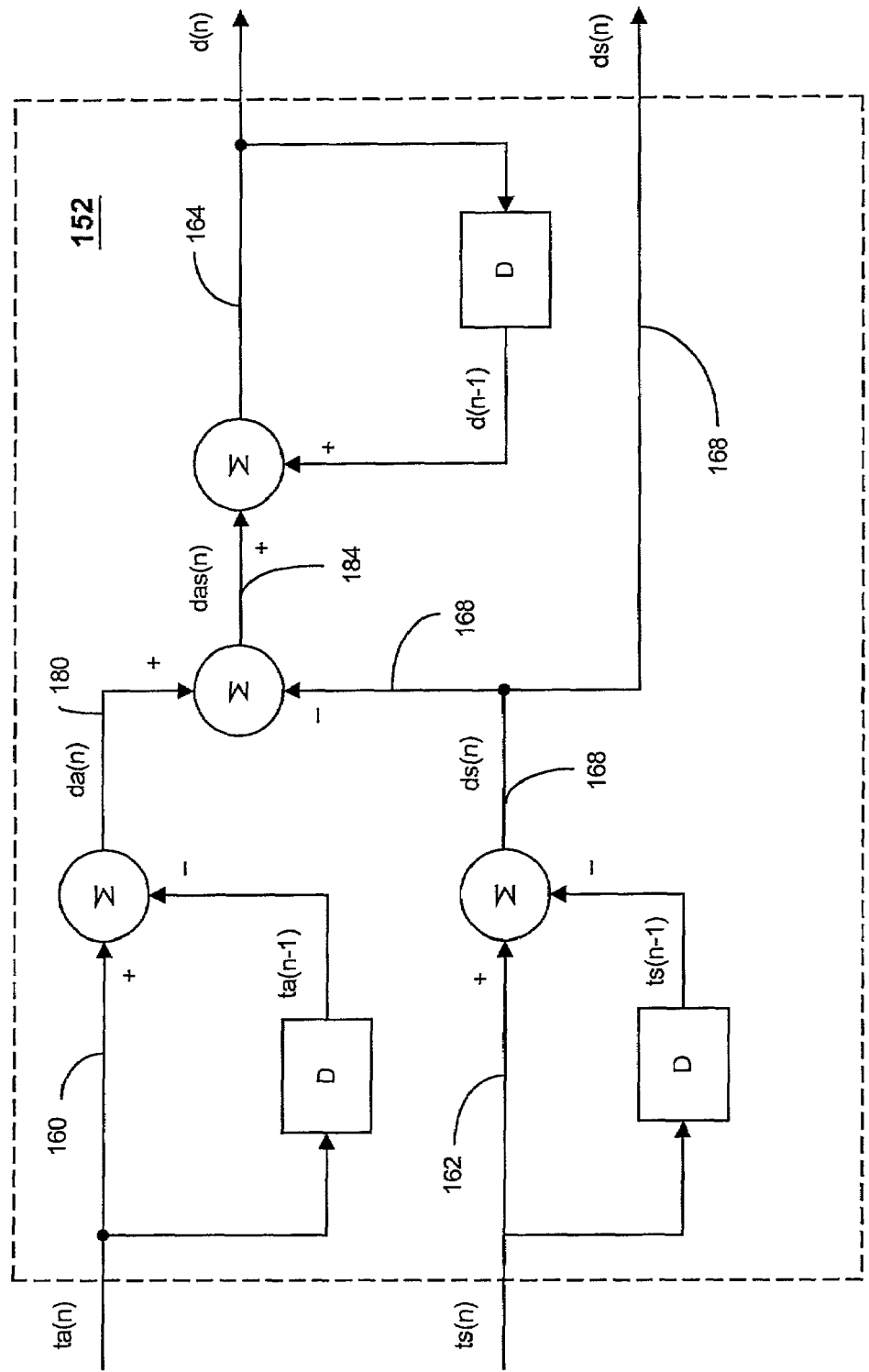
FIG. 3 is a schematic diagram of the logic of a gap difference calculator.

Referring now to FIG. 3, a schematic diagram of the logic of a gap difference calculator is shown. For every packet received, gap difference calculator 152 computes the relative difference between arrival time gap da(n) 180 and sending time gap ds(n) 168. Gap difference calculator 152 accepts as input arrival timestamp ta(n) 160 and sending timestamp ts(n) 162.

As shown in FIG. 3, the arrival time gap da(n) 180 between two consecutive packets is calculated as:

$$da(n)=ta(n)-ta(n-1) \quad\quad 1)$$

The sending time gap ds(n) 168 is:

$$ds(n)=ts(n)-ts(n-1) \quad\quad 2)$$

The difference between arrival time gap da(n) 180 and sending time gap ds(n) 168 is time gap difference das(n) 184 which is calculated as:

$$das(n)=da(n)-ds(n) \quad\quad 3)$$

The relative gap difference d(n) 164 between arrival time gap da(n) 180 and sending time gap ds(n) 168 with respect to those of the first (0-th) packet will be:

$$d(n)=d(n-1)+das(n). \quad\quad 4)$$

Utilizing the above equations 1) to 4);

| | |
|---|---|
| d(n) − d(n−1) | |
| = das(n) | // using 4) |
| = da(n) − ds(n) | // using 3) |
| = ta(n) − ta(n−1) − ts(n) + ts(n−1) | // using 1) and 2) |

Thus;

$$d(n)-d(n-1)=ta(n)-ta(n-1)-ts(n)+ts(n-1) \quad\quad 5)$$

So;

$$\text{for } n=1: d(1)-d(0)=ta(1)-ta(0)-ts(1)+ts(0) \quad\quad 6)$$

$$\text{for } n=2: d(2)-d(1)=ta(2)-ta(1)-ts(2)+ts(1) \quad\quad 7)$$

$$\text{for } n=3: d(3)-d(2)=ta(3)-ta(2)-ts(3)+ts(2) \quad\quad 8)$$

...

$$\text{for } n=n: d(n)-d(n-1)=ta(n)-ta(n-1)-ts(n)+ts(n-1) \quad\quad 9)$$

Adding all the equations from 6) to 9) yields:

$$d(n)-d(0)=(ta(n)-ta(0))-(ts(n)-ts(0)) \quad\quad 10)$$

Since the initial state of d(0) should be 0, we obtain $$d(n)=(ta(n)-ta(0))-(ts(n)-ts(0)) \quad\quad 11)$$

The reason for utilizing the 0-th packet follows. The present invention deals with two issues, namely clock drifting and jitter. Since clock drifting is a very slowly changing process, if a comparison is made between the current packet to recently incoming packets, it is not possible to distinguish any noticeable drifting since the drifting is concealed completely by the jitter. However, by utilizing the 0-th packet as a base, over time, the drifting becomes more detectable.

The present invention does not utilize equation 11) directly, as arrival timestamp ta(n) 160 will increase over time and at some point it will wrap around and become non-distinguishable with the arrival timestamp of the 0-th packet (ta(0)). The same will occur with sending timestamp ts(n) 162 and the sending timestamp of the 0-th packet (ts(0)). Thus the present invention utilizes packet n and packet n−1 to do the computation as they are distinguishable.

Gap difference calculator 152 provides as output:
a) relative gap difference d(n) 164 which is relative difference between arrival time gap da(n)180 and sending time gap ds(n) 168 with respect to those of the first (0-th) packet; and
b) sending time gap ds(n) 168.

Figure 4:
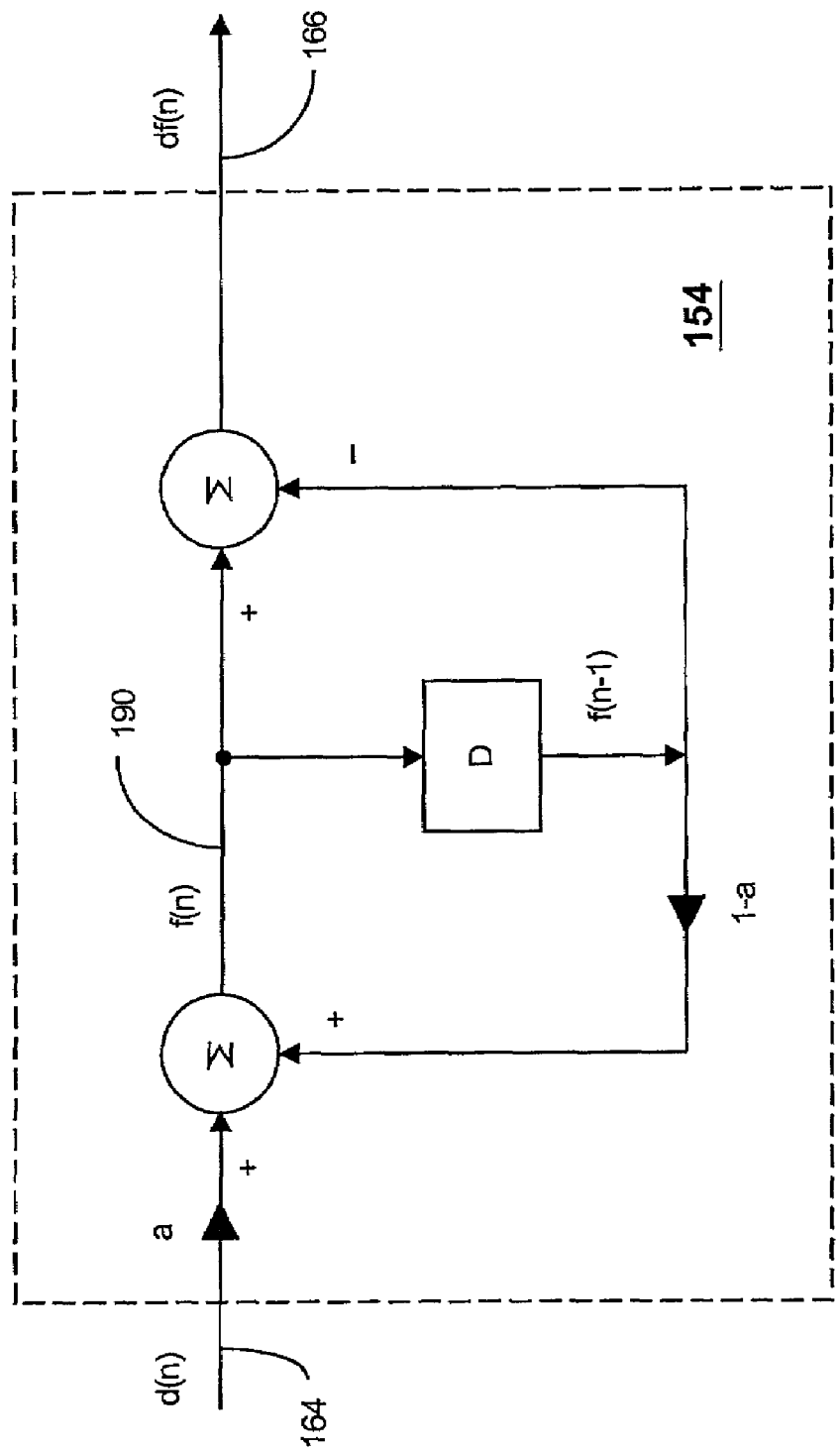
FIG. 4 is a schematic diagram of the logic of a gap difference smoother.

Referring now to FIG. 4, a schematic diagram of the logic of a gap difference smoother is shown. For every packet received, gap difference smoother 154 accepts relative gap difference d(n) 164 as input, calculates a smoothed gap difference f(n) 190, and outputs the smoothed relative gap difference between two consecutive packets as change in gap difference df(n)166.

Relative gap difference d(n) 164 is smoothed by a Low Pass Filter (LPF) such that:

$$f(n)=(1-a)*f(n-1)+a*d(n)$$

where smoothed gap difference f(n) 190 is the filtered (smoothed) difference, and the value of "a" is the parameter to control the filter's bandwidth.

The change in gap difference df(n) 166 between two consecutive packets is:

$$df(n)=f(n)-f(n-1)$$

Figure 5:
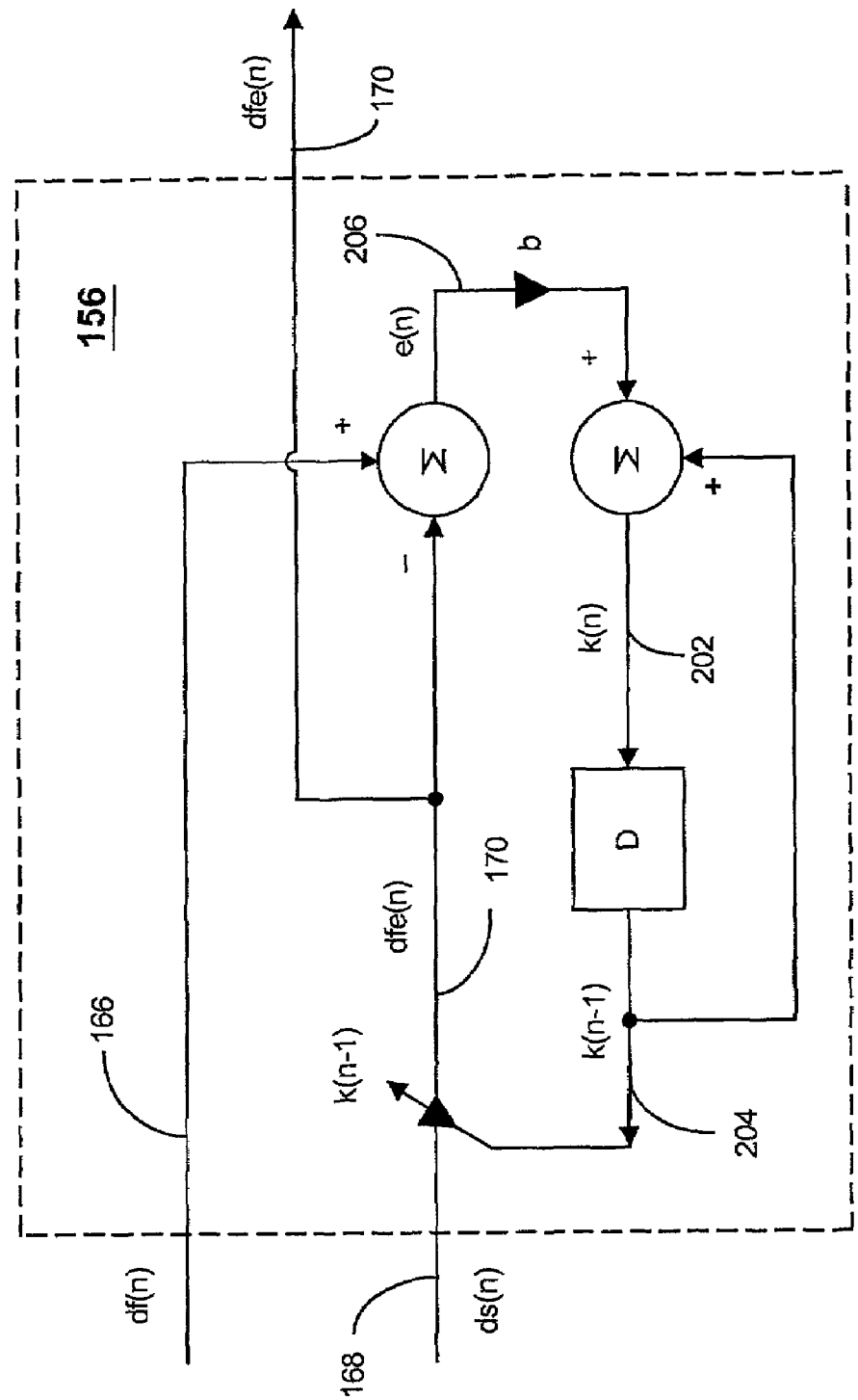
FIG. 5 is a schematic diagram of the logic of a slope estimator.

Referring now to FIG. 5, a schematic diagram of the logic of a slope estimator is shown. For every packet, slope estimator 156 dynamically adjusts the slope of the ratio between the values of df(n) and ds(n), based on the difference between the estimated change in gap difference dfe(n) 170 and the change in gap difference df(n) 166 between two consecutive packets.

Packet slope estimator 156 takes as input change in gap difference df(n) 166 and sending time gap ds(n) 168.

If clock frequencies at video server 102 and gateway 106 are drifting away from each other slowly, then change in gap difference df(n) 166 should be approximately proportional to sending time gap ds(n) 168 in a reasonably long time period. For example if one were to plot a 2-dimensional df( ) versus ds( ) graph over all values of n, it should approximate a straight line, the slope k(n) 202 should fluctuate slightly around a value. Assuming the previous slope is k(n−1) 204, then previous slope k(n−1) 204 may be used to modify sending time gap ds(n) 168 to create estimated change in gap difference dfe(n) 200. Thus:

$$dfe(n)=k(n-1)*ds(n)$$

The slope k(n) 202 can be initiated to be k(0)=0, which signifies that the two frequencies of the clocks of video source 102 and gateway 106 are initially assumed to be locked without drifting.

Comparing the estimated change in gap difference dfe(n) 170 and the change in gap difference df(n) 166, yields the error (i.e. the difference) e(n) 206:

$$e(n)=df(n)-dfe(n)$$

If error e(n) 206 is positive, it means the change has been underestimated and the slope should be increased. Conversely, if error e(n) 202 is negative, the change has been overestimated and the slope should be decreased. Thus the slope is adjusted by:

$$k(n)=k(n-1)+b*e(n)$$

where b is a parameter used to adjust tracking. The larger the value of b, the less time it takes for slope k(n) 202 to catch up with the actual rate. However, it undesirably results in the system oscillating without being able to converge to a steady state. The parameter b should be set based on the trade-off consideration of fast tracking and oscillation avoiding.

This value of the constant "b" is the step that controls the adjustment speed. The value of "b" can be determined based on considerations for convergence time, tracking resolution, and stability. Being adjusted this way, over time, the ratio (slope) will converge to a certain value, and the delivery time at video decoder 110 can be calculated. Thus the jitter can be removed. Experimentation has shown that typical values for "b" are around $10^{\wedge}(-9)$. In one implementation the value of $2^{\wedge}(-28)$ which is $3.725*10^{\wedge}(-9)$ was found to be acceptable.

Figure 6:
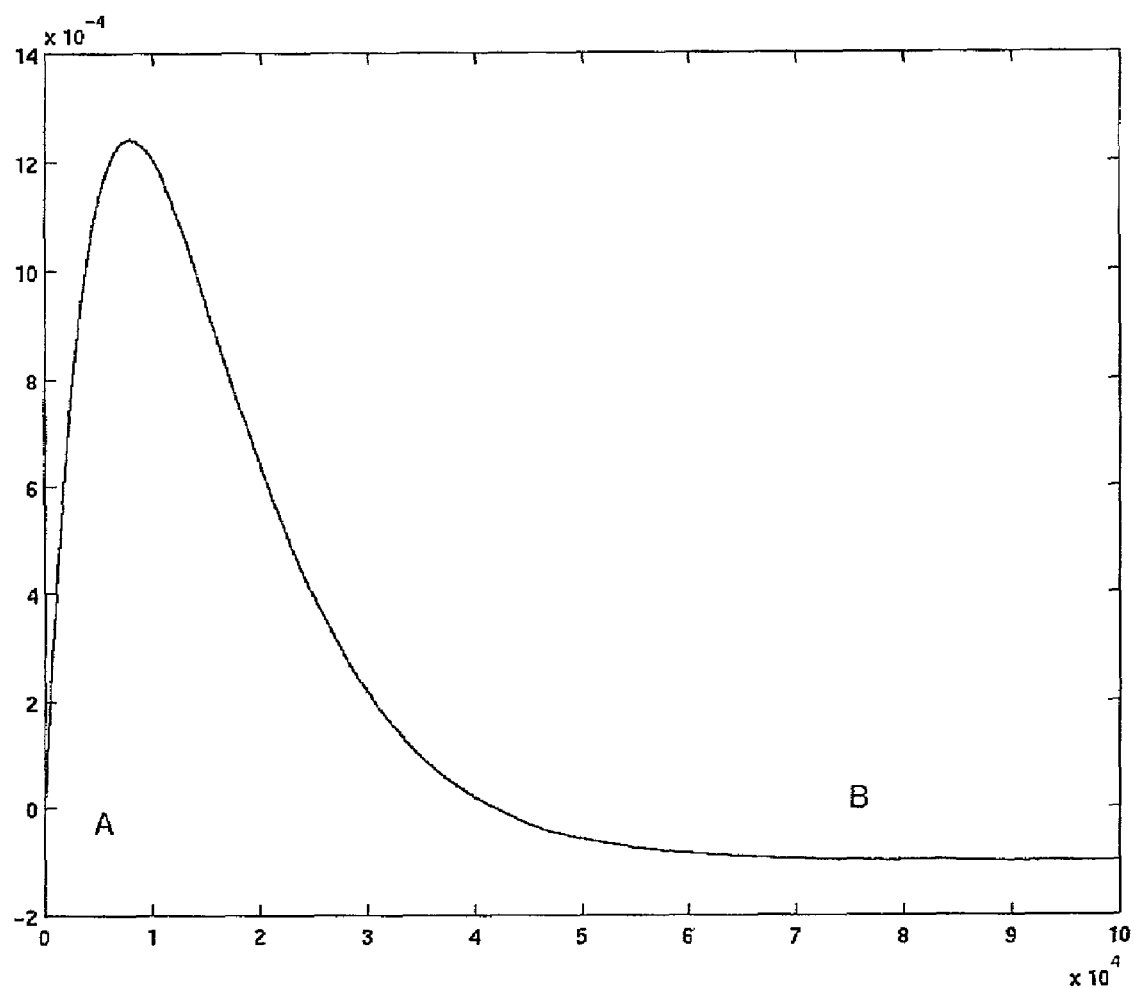
FIG. 6 is graph of convergence time.

Referring now to FIG. 6, a graph of convergence time is shown generally as 210. Convergence time is the time it takes a dynamic system from its initial value (which is usually a random guess) to its steady-state value. The convergence time is the duration between point A to point B which is roughly $7.5*10^{\wedge}4$. The horizontal axis of graph 210 is time and the vertical axis is rate.

Figure 7:
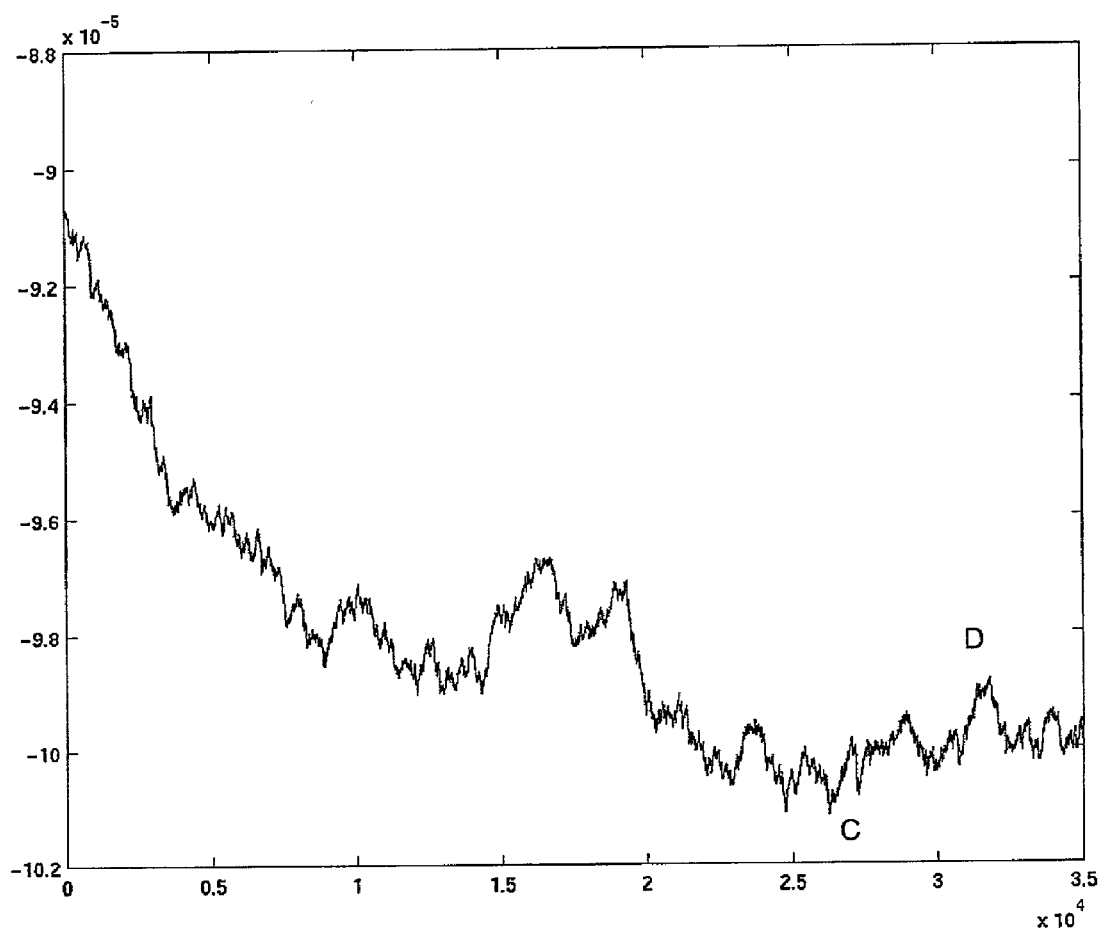
FIG. 7 is a graph of tracking resolution.
Figure 7:

Referring now to FIG. 7 a graph of tracking resolution is shown generally as 220. Tracking resolution is the rate fluctuation when the dynamic system enters the steady state as shown in graph 220, which is a zoomed-in plot of graph 210 of FIG. 6 around the point B. Here the tracked rates are roughly $-10.1*10^{\wedge}(-5)$ and $-9.9*10^{\wedge}(-5)$ for points C and D. Thus, the tracking resolution is roughly $0.2*10^{\wedge}(-5)$.

Figure 8:
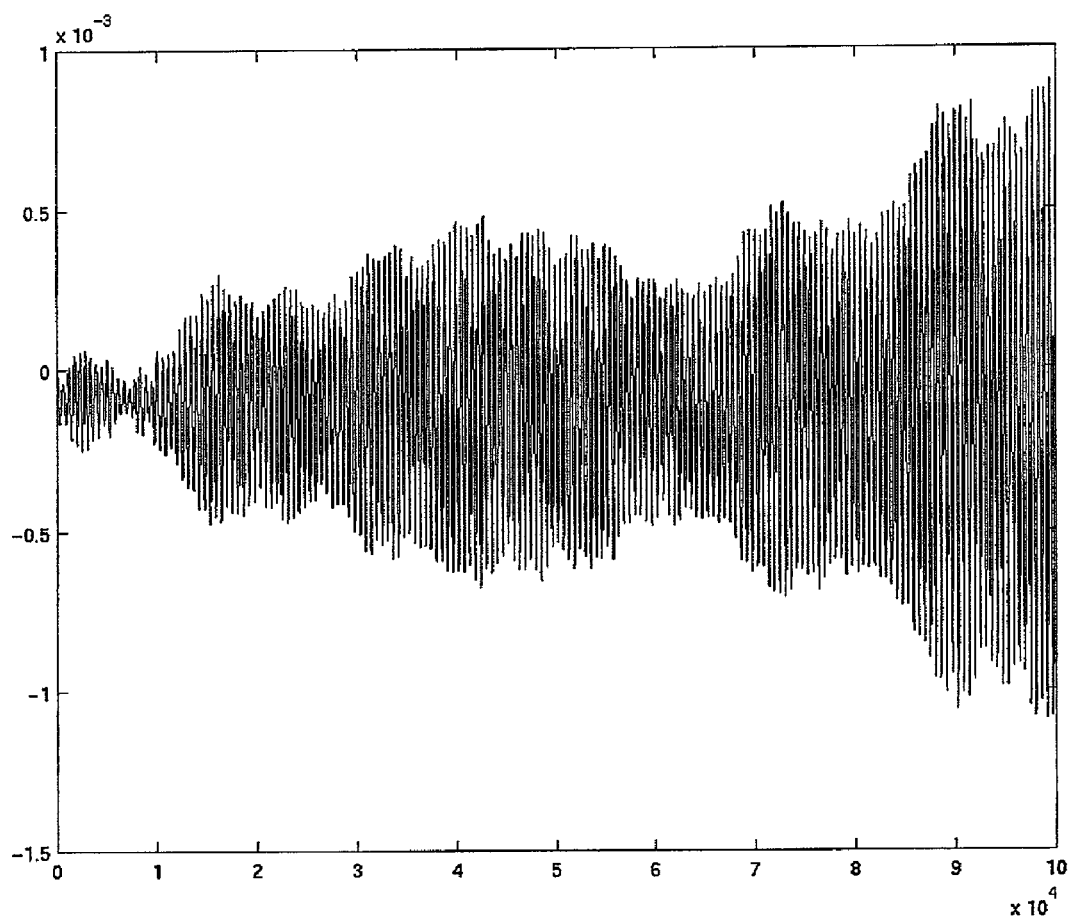
FIG. 8 is a graph of stability.

Referring now to FIG. 8 a graph of stability is shown generally as 230. Stability refers to whether a dynamic system can enter its steady state after a definite period. Graph 230 illustrates a stable system since it can enter steady state starting at point B. Graph 230 illustrates an unstable system, as the tracking rate will never converge. The system of graph 230 oscillates around the desired rate $-0*10^{\wedge}(-5)$ and the amplitude becomes larger and larger. The horizontal axis of Graph 230 is time and the vertical axis is rate.

Figure 9:
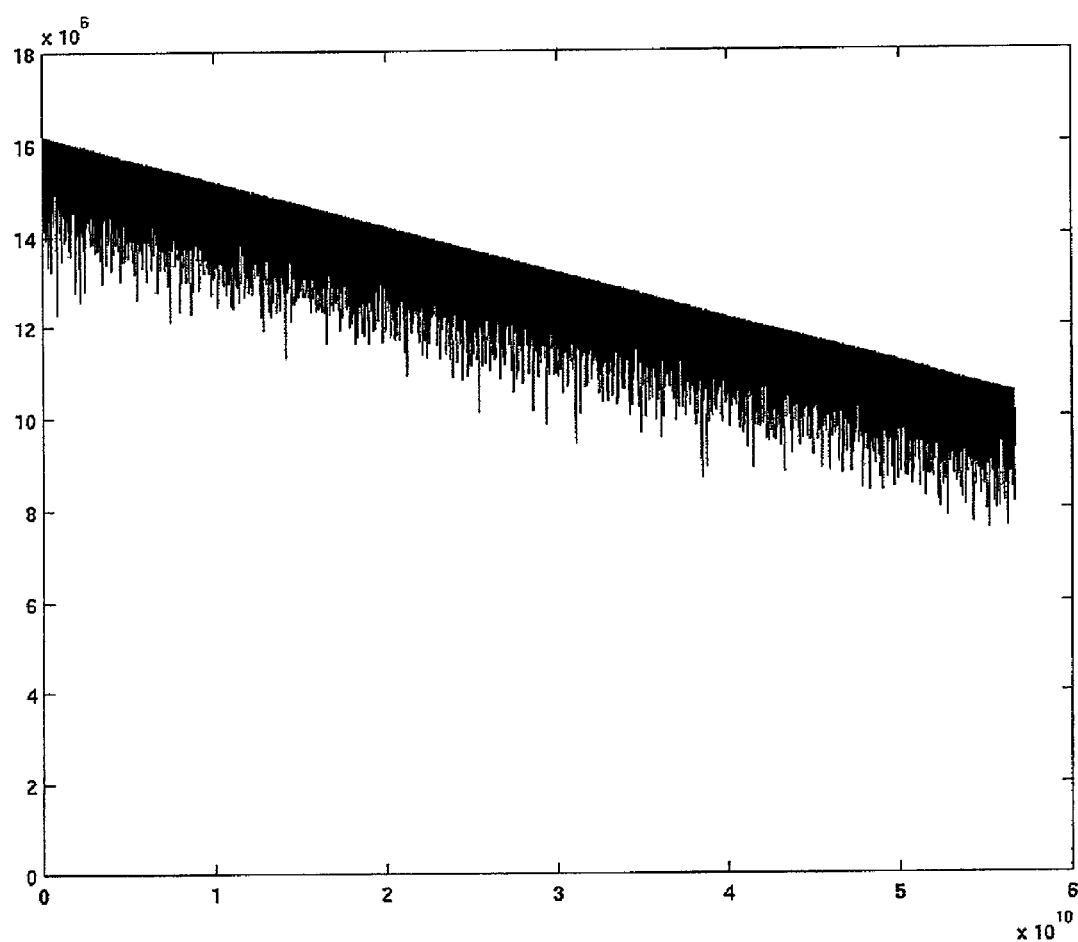
FIG. 9 is a graph of the difference in arrival and sending timestamps versus sending timestamps.
Figure 10:
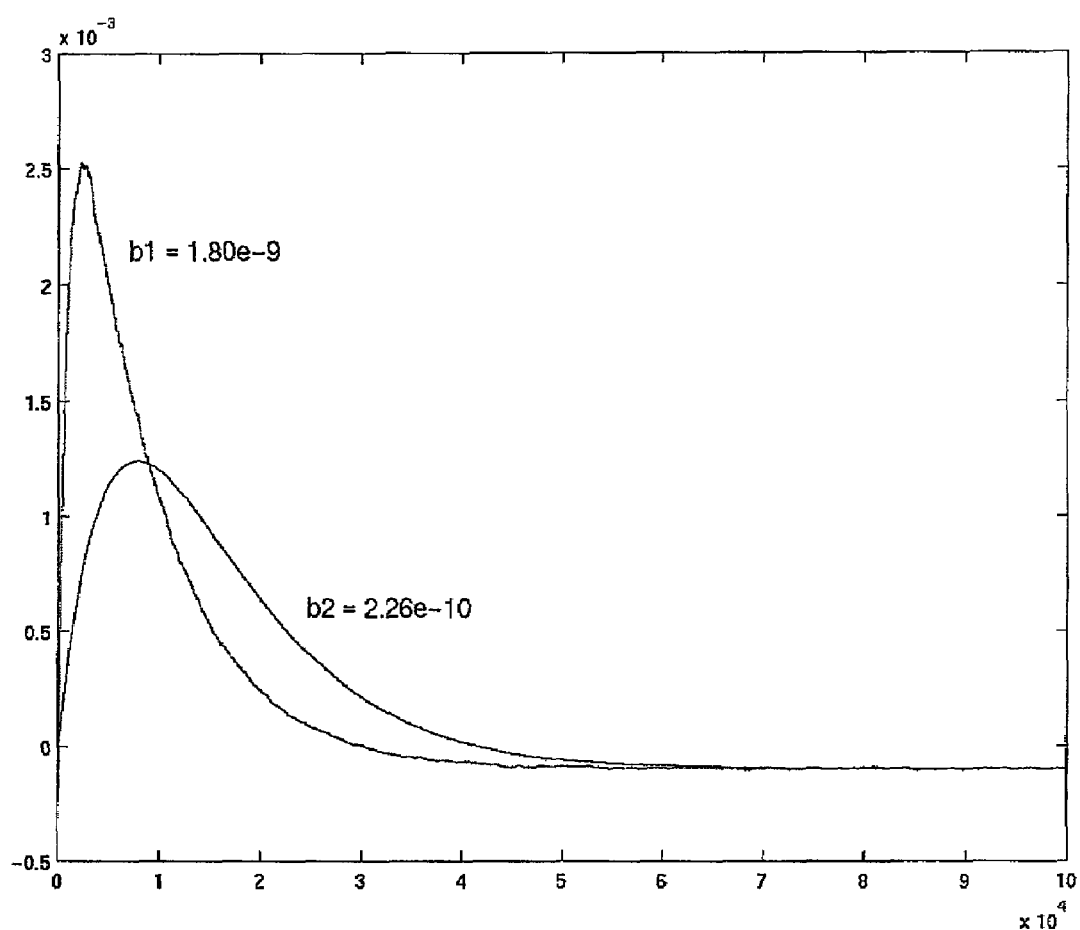
FIG. 10 is a graph of tracking rate convergence.
Figure 11:
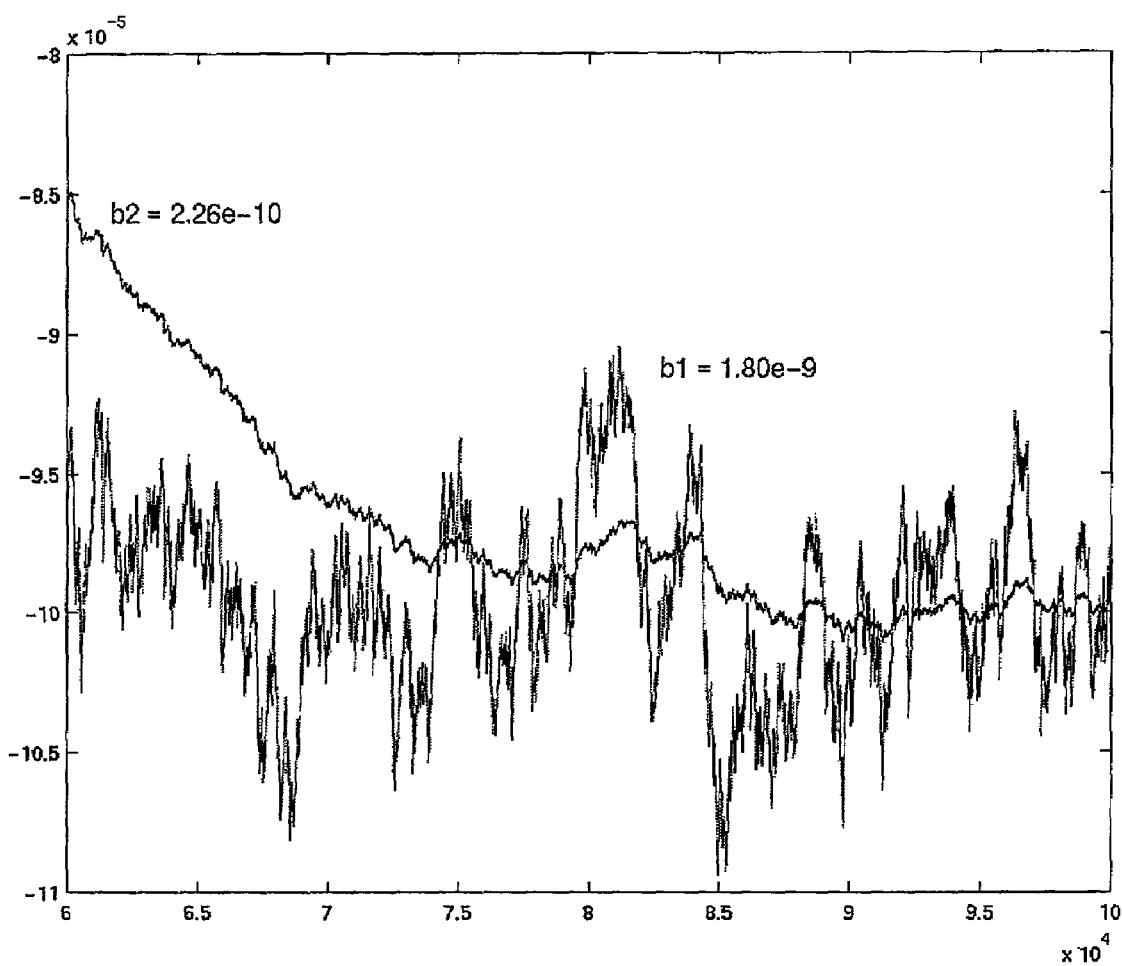
FIG. 11 is a graph of the tail end of the graph of FIG. 10.

FIGS. 9 to 11 illustrate simulation data.

Referring now to FIG. 9 a graph of the difference in arrival and sending timestamps versus sending timestamps is shown generally as 240. Specifically graph 240 illustrates ta( )−ts( ) vs. ts( ). The horizontal axis is x( ) and the vertical axis is y( ), where x(n)=ts(n) and y(n)=ta(n)−ts(n). Both axes are in units of 27 MHz tick; i.e. one tick is $\frac{1}{27,000,000}$ seconds. The drifting rate is the slope from which two points can be chosen. For example choosing:

$$(x(a),y(a))=(0, 16*10^{\wedge}6);$$

$$(x(b),y(b))=(5*10^{\wedge}10, 11*10^{\wedge}6);$$

then the slope will be:

$$(y(b)-y(a))/(x(b)-x(a))=(11*10^{\wedge}6-16*10^{\wedge}6)/(5*10^{\wedge}10-0)=-1.0*10^{\wedge}(-4)$$

Thus, the clock drifting rate for about 30 minutes is about $-1.0*10^{\wedge}(-4)$, and jitter is around 100 milliseconds.

Referring now to FIG. 10, a graph of tracking rate convergence is shown generally as 250. With regard to graph 250, two adjustment steps, $b1=1.80*10^{\wedge}(-9)$ and $b2=2.26*10^{\wedge}(-10)$ were utilized for simulation. Graph 250 illustrates the tracking rate converging process. With a larger adjustment step b1, the tracking rate takes less time to reach steady state. The horizontal axis is time, the vertical axis is rate.

Referring now to FIG. 11, a graph of the tail end of graph 250 of FIG. 10 is shown generally as 260. Graph 260 is a zoomed-graph of the tail part of graph 250. It shows that a smaller adjustment step will result in a much finer tracking resolution. The trade-off between those two aspects should be taken into account when selecting an optimal value for b.

Figure 12:
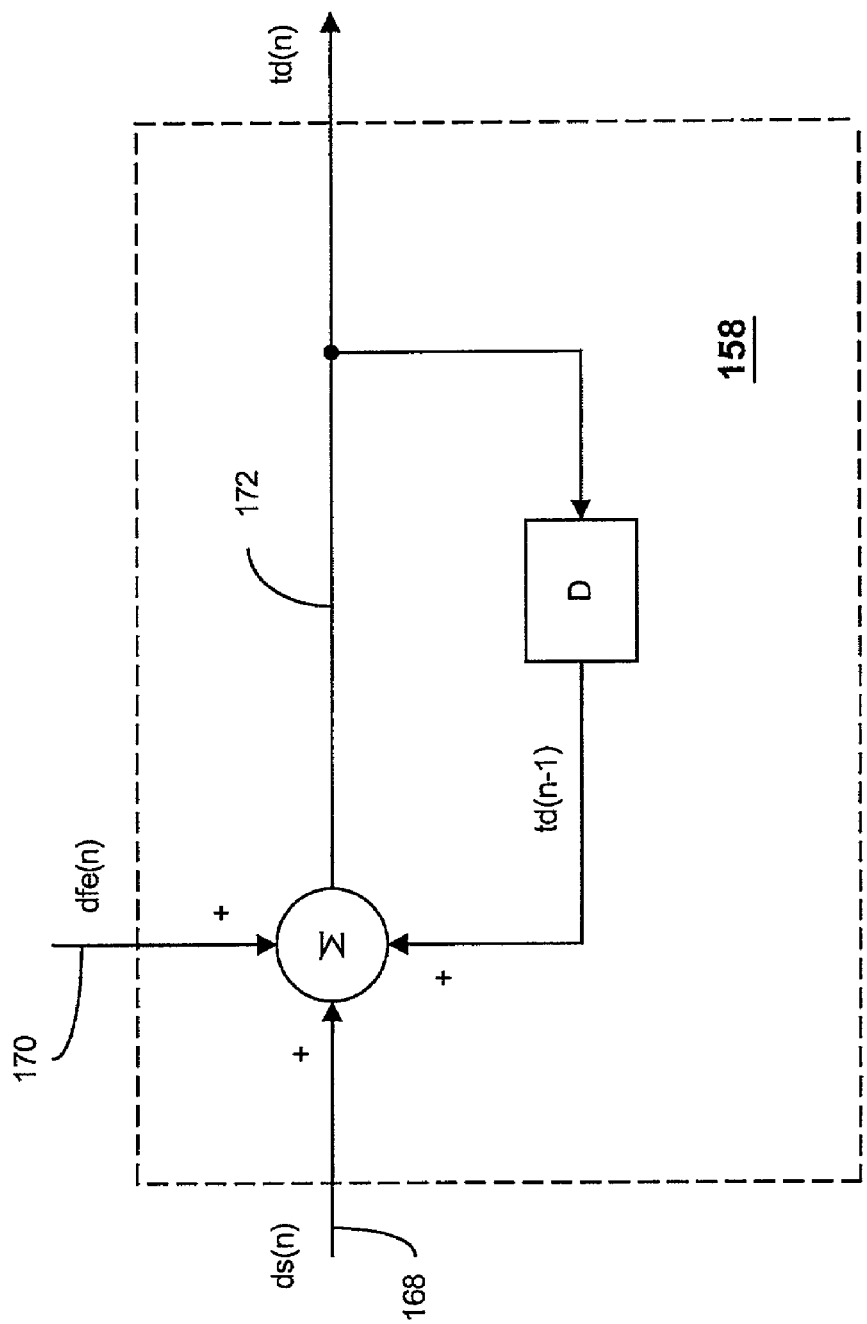
FIG. 12 is a schematic diagram of the logic of a delivery time calculator.

Referring now to FIG. 12, a schematic diagram of the logic of a delivery time calculator is shown. For every packet received, delivery time calculator 158 calculates delivery time td(n) 172 based upon the values of sending time gap ds(n) 168 and estimated change in gap difference dfe(n) 170.

The delivery time td(n) 172 to output the n'th packet to HFC network 108 (see FIG. 1) is calculated as:

$$td(n)=td(n-1)+ds(n)+dfe(n)$$

td(n−1) is the delivery time of the previous packet and is initiated as $$td(0)=ta(0)+D0$$

where ta(0) is the arrival time of the 0' th packet and D0 is a constant delay. D0 is roughly the system delay of the gateway 106. It is determined by the sum of the maximum jitter handling the gateway is configured to support, packet processing time such as transcoding and remuxing, and some safety margin.

The present invention permits a VoD transmission to run an arbitrarily long time without play back disruption on the user (video decoder 110) side caused by buffer underflow or overflow. The present invention achieves this by tracking the difference between the clocks of the video source 102 and the gateway 106.

The present invention requires very moderate computation and can be implemented with fixed-point arithmetic either in software or hardware. For the processing of each packet only one multiplication, one shift and a few additions and subtractions are required. No division operations are needed.

Although the disclosure of the present invention utilizes Video on Demand (VoD) as an example, it is not the intent of the inventors to restrict the present invention to VoD systems. The present invention may be utilized in any form of streaming media that needs to address the issue of jitter compounded by clock drifting. The present invention is applicable to any streaming media that requires synchronization between source and destination. This includes multicast video, multicast audio, streaming video/audio, multimedia gaming, or multimedia conferencing. The types of networks that may be used include IP, MMDS, LMDS, satellite distribution, local video distribution network, ATM, SONET/SDH, fixed/mobile wireless, and Ethernet/firewire.

Although the invention has been described with reference to certain specific embodiments, various modifications thereof will be apparent to those skilled in the art without departing from the spirit and scope of the invention as outlined in the claims appended hereto.

We claim:

1. A system for reducing jitter and clock drifting in streaming media, said system comprising:
   a) a gap difference calculator configured to calculate a difference between two timestamps;
   b) a gap difference smoother operatively connected to said gap difference calculator and configured to reduce variation of delay between packets;
   c) a slope estimator operatively connected to said gap difference smoother and said gap difference calculator and configured to detect a frequency difference between two clocks; and
   d) a delivery time calculator operatively connected to said gap difference calculator and said slope estimator and configured to output a deliver time for a packet.

2. The system of claim 1, wherein said gap difference calculator accepts as input an arrival timestamp and a sending timestamp, said gap difference calculator utilizing said arrival timestamp and said sending timestamp to output a relative gap difference and a sending time gap.

3. The system of claim 1 wherein said gap difference smoother accepts as input a relative gap difference and utilizes said relative gap difference to output a change in gap difference.

4. The system of claim 1 wherein said slope estimator accepts as input a change in gap difference and a sending time gap and utilizes said gap difference and said sending time gap to provide as output an estimated change in gap difference.

5. The system of claim 1 wherein said delivery time calculator accepts as input a sending time gap and a estimated change in gap difference and utilizes said sending time gap and said estimated change in gap difference to provide as output the delivery time.

6. A method for reducing jitter and clock drifting in streaming media said method comprising the steps of:
   a) accepting an arrival timestamp and a sending timestamp for a current packet;
   b) utilizing said arrival timestamp and said sending timestamp to create a relative gap difference and a sending time gap, for said current packet;
   c) utilizing said relative gap difference to create a change in gap difference;
   d) utilizing said change in gap difference and said sending time gap to create an estimated change in gap difference; and
   e) utilizing said sending time gap and said estimated change in gap difference to create a delivery time.

7. The method of claim 6 wherein creating said relative gap difference at step b) comprises the steps of:
   i) combining said rival timestamp with the arrival timestamp of the packet immediately previous to said current packet, to create an arrival time gap;
   ii) combining said arrival time gap with said sending time gap to create a time gap difference; and
   iii) combing said time gap difference with the previous value of said relative gap difference to create said relative gap difference.

8. The method of claim 6 wherein creating sad sending time gap at step b) copses the step of combining said sending timestamp with the sending timestamp of the packet immediately previous to said current packet.

9. The method of claim 6 wherein creating said change in gap difference at step c) comprises the steps of:
   i) combining said relative gap difference through the use of a first filter with the smoothed gap difference of the packet immediately previous to said current packet, said smoothed gap difference of the packet immediately previous to said current packet being modified by a second filter, said combining resulting in a smoothed gap difference for said current packet; and
   ii) combining said smoothed gap difference for said current packet with said smoothed gap difference of the packet immediately previous to said current packet to create said change in gap difference.

10. The method of claim 6 wherein creating said estimated change in gap difference at step d) comprises the steps of:
   i) modifying said sending time gap by a previous slope to create said estimated change in gap difference;
   ii) combining said estimated change in gap difference with said change in gap difference to create an error value;
   iii) modifying said error value by a parameter to adjust tracking; and
   iv) combining the output of step iii) with said previous slope to create a current slope value.

11. The method of claim 6 wherein creating said delivery time at step e) comprises the step of combining said sending time gap with said estimated change in gap difference and the delivery time of the packet immediately previous to said current packet to create said delivery time.

12. A system for reducing jitter and clock drifting in streaming media, said system comprising:
   a) means for calculating a gap difference;
   b) means for smoothing a difference, operatively connected to said means for calculating a gap difference;
   c) means for estimating slope, operatively connected to said means for calculating a gap difference and said means for smoothing a difference; and
   d) means for calculating a delivery time, operatively connected to said means for calculating a gap difference and said means for estimating slope.

13. The system of claim 12, wherein said means for calculating a gap difference accepts as input an arrival timestamp and a sending timestamp, said means for calculating a gap difference utilizing said arrival timestamp and said sending timestamp to generate a relative gap difference and a sending time gap.

14. The system of claim 12 wherein said means for smoothing a difference accepts as input a relative gap difference and utilizes said relative gap difference to output a change in gap difference.

15. The system of clam 12 wherein sad means for estimating slope accepts as input a change in gap difference and a sending time gap and utilizes said gap difference and said sending time gap to provide as output an estimated change in gap difference.

16. The system of claim 12 wherein said means for calculating a delivery time accepts as input a sending time gap and a estimated change in gap difference and utilizes said sending time gap and said estimated change in gap difference to provide as output a delivery time.

\* \* \* \* \*